United States Patent Office 3,270,073
Patented August 30, 1966

3,270,073
SELECTIVE EXTRACTION OF AROMATIC HYDROCARBONS WITH POLYESTERS
Earl F. Carlston, El Cerrito, and William G. Toland, San Rafael, Calif., assignors to Chevron Research Company, a corporation of Delaware
No Drawing. Filed Oct. 19, 1962, Ser. No. 231,839
2 Claims. (Cl. 260—674)

This invention relates to a method of separating hydrocarbons. More particularly, this invention relates to a method of separating aromatic hydrocarbons from aliphatic hydrocarbons using polyesters.

The availability of mixtures of hydrocarbons frequently makes it desirable to separate the mixture into an aromatic fraction and an aliphatic fraction. Numerous methods of accomplishing the separation have appeared in the literature. Many of these methods have used the polyoxyalkylene glycols, commonly known as Carbowaxes, and their derivatives. See, for example, U.S. Patents Nos. 2,770,663, 2,878,261, 2,960,548, etc. Other compounds which have also been used as extractants are carbamates, U.S. Patents Nos. 2,915,569 and 2,956,088; oxazolidines, U.S. Patent No. 2,932,675, and γ-lactones, U.S. Patent No. 2,943,122. According to the usual method, the separation of the hydrocarbon fraction is accomplished by dissolving into the extracting compound a fraction of the mixture which is rich in one of the components leaving a raffinate which is enriched with the other component.

It has now been found that the separation of aromatic hydrocarbons from aliphatic hydrocarbons in a mixture containing the two may be accomplished by extracting the mixture with a polyester. The hydrocarbon mixture is contacted with the polyester yielding a polyester phase having a hydrocarbon mixture enriched with aromatic hydrocarbon and a raffinate enriched with aliphatic hydrocarbon. The aromatic enriched mixture may then be isolated in a variety of ways known in the art.

The polyester is a polymer having predominantly hydroxyl end groups and having an average molecular weight of from about 300 to 2,000, preferably in the range of about 350 to 800. The polymers in this range are generally liquids and may be readily handled. The average mol ratio of dibasic acid to polyol used in preparation of the polymer will be in the range of about 1:1 to 1:2, preferably of about 1:1.05 to 1:1.50.

The dibasic acids used in the formation of the polymer may have aromatic or aliphatic hydrocarbon groups. The acids may vary from 4 to 10 carbons, but it is preferred that they have from 6 to 8 carbons. It is particularly preferred that the acids be aliphatic. As examples of dibasic acids which can be used in this invention are succinic, glutaric, adipic, pimelic, suberic, azelaic, sebacic, phthalic, isophthalic, terephthalic, 3-methylphthalic, etc. While branch-chain aliphatic acids may be used, the straight-chain aliphatic dibasic acids are more readily available, and to that degree preferred. Although, the saturated aliphatic acids are preferred, unsaturated acids such as maleic, fumaric, 1-tetrahydrophthalic, etc., may also be used.

The alcohols which find application in the preparation of the polyester are of from 2 to 6 carbons and may have ethereal oxygen. That is, glycols, free of unsaturation, containing only carbon, hydrogen and oxygen. Illustrative of glycols useful in this invention are ethylene glycol, 1,2-propylene glycol, 1,3-propylene glycol, diethylene glycol, 1,6-hexanediol, etc. Particularly preferred are ethylene glycol and diethylene glycol.

The weight ratio of polyester to hydrocarbon used for the extraction is mainly one of expediency and can be varied relatively widely. Weight ratios of polyester to hydrocarbon in the range of about 1–10:1 may be used but preferably from about 1.5 to about 5 parts of polyester will be used per part of hydrocarbon mixture.

The extraction of the hydrocarbon mixture may be carried out either batchwise or by countercurrent treatment. Successive batchwise extractions may be used. Various contacting and separating techniques are well known in the art and may be applied to the process of this invention. The raffinate, that is the aliphatic enriched phase, will be relatively free of the polyester and can be used directly for further treatment. The aromatic enriched hydrocarbon mixture in the polyester phase may be recovered in a variety of ways. Distillation at sub- or atmospheric pressure may be used. Extraction with a secondary solvent is also operable. The secondary solvent may then be separated from the aromatic enriched phase by a variety of methods known in the art, e.g., distillation. One skilled in this art will know the extraction conditions to apply and the recovery steps necessary in view of the type of aromatic to be separated.

The temperature and pressure at which the extraction is carried out may be varied, although it is most expediently carried out at ambient temperatures and autogenous pressures. Temperatures in the range of 15° to 100° C. may be used, depending on the particular hydrocarbon mixture and the particular polyester, but the temperature used is not critical to the invention. As already indicated, the pressure is not critical and elevated pressures may be used if desired.

The process of this invention is operable with any hydrocarbon mixture from which an economical amount of aromatic hydrocarbon can be obtained. The products obtained from catalytic reforming, hydrocracking, and dehydrocyclization processes are illustrative of methods which provide mixtures which can be used with advantage in this invention. It is only necessary that the hydrocarbon mixture should be liquid at the temperatures of the extraction and not subject to decomposition during the extraction or to reaction with the polyester used.

Various aliphatic and alicyclic hydrocarbons may be separated from aromatic hydrocarbons. Illustrative of aliphatic hydrocarbons which may be extracted from aromatic hydrocarbons are the following compounds: i-pentane, n-pentane, cyclopentane, 2,2-dimethylbutane, 2,3-dimethylbutane, 2-methylpentane, 3-methylpentane, n-hexane, methylcyclopentane, 2,2-dimethylpentane, cyclohexane, 2,2,3-trimethylbutane, 1,1-dimethylcyclopentane, 2-methylhexane, 1,3-dimethylcyclopentane, n-heptane, 2, 2,4-trimethylpentane, n-octane, n-decane, dodecanes, etc. Aromatic hydrocarbons which may be extracted are illustrated by the following compounds: benzene, toluene, ortho-, meta-, para-xylene, ethylbenzene, cumene, paracymene, mesitylene, durene, etc. The aromatic and aliphatic hydrocarbons will generally be in the range of from 6 to 12 carbons.

The following examples will serve to further illustrate the invention and are not intended as limitations.

EXAMPLE I

Into a separatory funnel was introduced 200 g. of diethylene glycol adipate polymer [1] and 100 g. of a mixture of 1 part benzene to 1 part n-hexane. The mixture was shaken for a few minutes and the phases were then allowed to separate. The upper layer was separated along with a small amount of the viscous lower layer. The weight of the upper layer was determined by difference after evaporation of the hydrocarbon mixture. The amount and composition of hydrocarbon in the lower layer was calculated, after the composition of the upper layer had been determined by vapor phase chromatography. It was found that 36 g. of the hydro- ---
[1] The preparation of the diethylene glycol adipate polymer is described in Example XII.

carbon mixture, containing 85% benzene, had dissolved in the ester polymer.

When the same procedure was carried out with a mixture containing 90% mixed xylenes and 10% octane, 42 g. of the hydrocarbon mixture, containing 95% xylene, was dissolved in the polyester.

The same procedure was repeated with 90% mixed xylenes and 10% octane and the polyester phase extracted with 13 g. of hexane. The mixture obtained had 55% xylene, 4% octane and 45% hexane, which on distillation provided almost total recovery of the xylenes in a fraction containing 98.3% xylene.

The following table describes a number of examples carried out in accordance with the method described in Example I.

Table I

| Ex. | Polymer [1] | Ratio of Extractant to Hydrocarbon | Benzene-Hexane | | Solubility of Hydrocarbon per 100 g. of Extractant |
|---|---|---|---|---|---|
| | | | Percent Aromatic in Hydrocarbon | Percent Aromatic in Hydrocarbon Extracted | |
| II | DEGA (I) | 2 | 49.7 | 85 | 18 |
| III | DEGA (II) | 1.8 | 49.7 | 87 | 19 |
| IV | DEGAz | 2 | 49 | 70 | 27 |
| | | | Xylene-Octane | | |
| V | DEGA (I) | 1.7 | 89.6 | 94 | 33 |
| VI [2] | DEGA (I) | 1.7 | 89.6 | 96.5 | 31 |
| VII | DEG IPA | 2 | [3] 50 | 83 | 26 |

[1] DEG—Diethylene glycol.
A—Adipate.
Az—Azelate.
IPA—Isophthalate.
DEGA (I)—prepared in Ex. XII.
DEGA (II)—prepared in Ex. XIII.
DEGAz—prepared in Ex. XV.
DEG IPA—prepared in Ex. XVI.
[2] Temperature was 50° C.
[3] n-Decane was used in place of n-octane.

The examples in the following table were carried out according to the following procedure:

A hydrocarbon solvent comprised of a mixture of aromatic hydrocarbon and paraffin in a 1:1 weight ratio was mixed with a polyester in a weight ratio of about 1 part to 2 parts at approximately 100° C. The mixture was then allowed to cool and the top solvent layer was poured off and weighed. The solvent contained in the resin was removed by distillation and the composition of the distillate was then analyzed by ultraviolet analysis. The following table lists the results.

Table II

| Ex. | Polymer [1] | Toluene-Heptane | |
|---|---|---|---|
| | | Percent aromatic in hydrocarbon extracted | Solubility of hydrocarbon per 100 g. of extractant |
| VIII | DEGS | 87 | 9.7 |
| IX | DEGA | 82 | 14.9 |
| | | Xylene-Decane | |
| X | DEGPA | 84 | 8.1 |
| | | Toluene-Decane | |
| XI | DEGAM | 95 | 11.6 |

[1] DEG=Diethylene glycol.
S=Succinic acid.
A=Adipic acid.
PA=Phthalic acid.
M=Maleic acid.
DEGS=Prepared in Ex. XIV.
DEGA=Prepared in Ex. XII.
DEGPA=Prepared in Ex. XVII.
DEGAM=Prepared in Ex. XVIII.

It is evident from the above tables that mixtures of hydrocarbons containing both aromatic hydrocarbons and paraffins may readily be separated by using polyesters. The esters have from good to excellent solubilizing properties in that a significant amount of the hydrocarbon is dissolved in the ester phase. Moreover, the polyesters are able to greatly enhance the amount of aromatic hydrocarbon in the mixture dissolved in the polyester.

The polyesters used are prepared in accordance with the usual procedures for preparing polyesters. The dibasic acid and the polyol are mixed and heated to esterification temperature. The water of esterification is removed through a packed reflux column designed to remove the steam and return condensed glycol to the kettle. The resulting product may be used directly. The following example illustrates the method of preparation for a particular ester.

EXAMPLE XII

In a 5 l. round bottom flask equipped with a mechanical stirrer, thermometer, $N_2$ gas inlet tube, and a steam heated packed reflux condenser, there was charged 1,590 g. (15.0 moles) of diethylene glycol and 1,460 g. (10.0 moles) of adipic acid. This mixture was heated to 160° C. at which time water began to distill off. The temperature was gradually raised to 230° C. over a period of 1 hour and 20 minutes. The mixture was stirred at this temperature for an additional 1 hour at which time a total of 376 ml. of distillate had been removed. The polyester product was cooled to room temperature.

The following table illustrates a number of polyesters prepared in accordance with the method described in Example VIII.

The process of this invention has a number of advantages over other processes. The high molecular weight of the polyester prevents it from being a competitor when distilling the aromatic extract. Moreover, countercurrent distribution is effective because of the high viscosity of the polyesters. Various inert materials may be impregnated with the polyester and the polyester used as a fixed column.

As will be evident to those skilled in the art, various modifications on this process can be made or followed, in the light of the foregoing disclosure and discussion,

Table III
PREPARATION OF POLYESTERS

| Ex. | Dibasic Acid [1] | Moles | Dihydroxy Compound | Moles | Temp., °C. | Time, Hrs. | Water, mls. |
|---|---|---|---|---|---|---|---|
| XIII | A | 10 | DEG | 10.5 | 170–200 | 3½ | 340 |
| XIV | S | 10 | DEG | 10.5 | 200 | 3 | 158 |
| XV | Az | 3.77 | DEG | 5.65 | 180–260 | 1 | 137 |
| XVI | IPA | 1 | DEG | 1.5 | 220–288 | ½ | 51 |
| XVII | PA | 9.9 | DEG | 10.5 | 207–230 | 3⅙ | 153 |
| XVIII | M:A (7.05:3.54) | 10.6 | DEG | 11.1 | 155–200 | 5 | 365 |

[1] A—Adipic acid.
Az—Azelaic acid.
IPA—Isophthalic acid.
PA—Phthalic acid.
M—Maleic acid.
DEG—Diethylene glycol.

without departing from the spirit or scope of the disclosure or from the scope of the following claims.

We claim:

1. A method of separating a hydrocarbon mixture containing aromatic and aliphatic hydrocarbons into an aromatic hydrocarbon enriched phase and in aliphatic hydrocarbon enriched phase, which comprises treating the hydrocarbon mixture with a polyester of average molecular weight of from about 300 to 2,000, prepared from dibasic hydrocarbon acids of from 4 to 10 carbons and glycols selected from the group consisting of ethylene glycol and diethylene glycol, wherein the weight ratio of the polyester to the hydrocarbon mixture is in the range of about 1–10:1, separating the raffinate from the polyester phase, and recovering the aromatic hydrocarbon enriched phase from the polyester.

2. A process according to claim 1, wherein said polyester is a polymer of adipic acid and diethylene glycol.

References Cited by the Examiner
UNITED STATES PATENTS 2,770,663  11/1956  Grote _____ 260—674
3,014,927  12/1961  Garber et al. _____ 260—674

DELBERT E. GANTZ, *Primary Examiner.*

JOSEPH R. LIBERMAN, *Examiner.*

C. E. SPRESSER, *Assistant Examiner.*